July 16, 1946.　　　H. H. FIELD　　　2,404,128
LOCK TO SECURE NUTS ON BOLTS
Filed Nov. 8, 1944
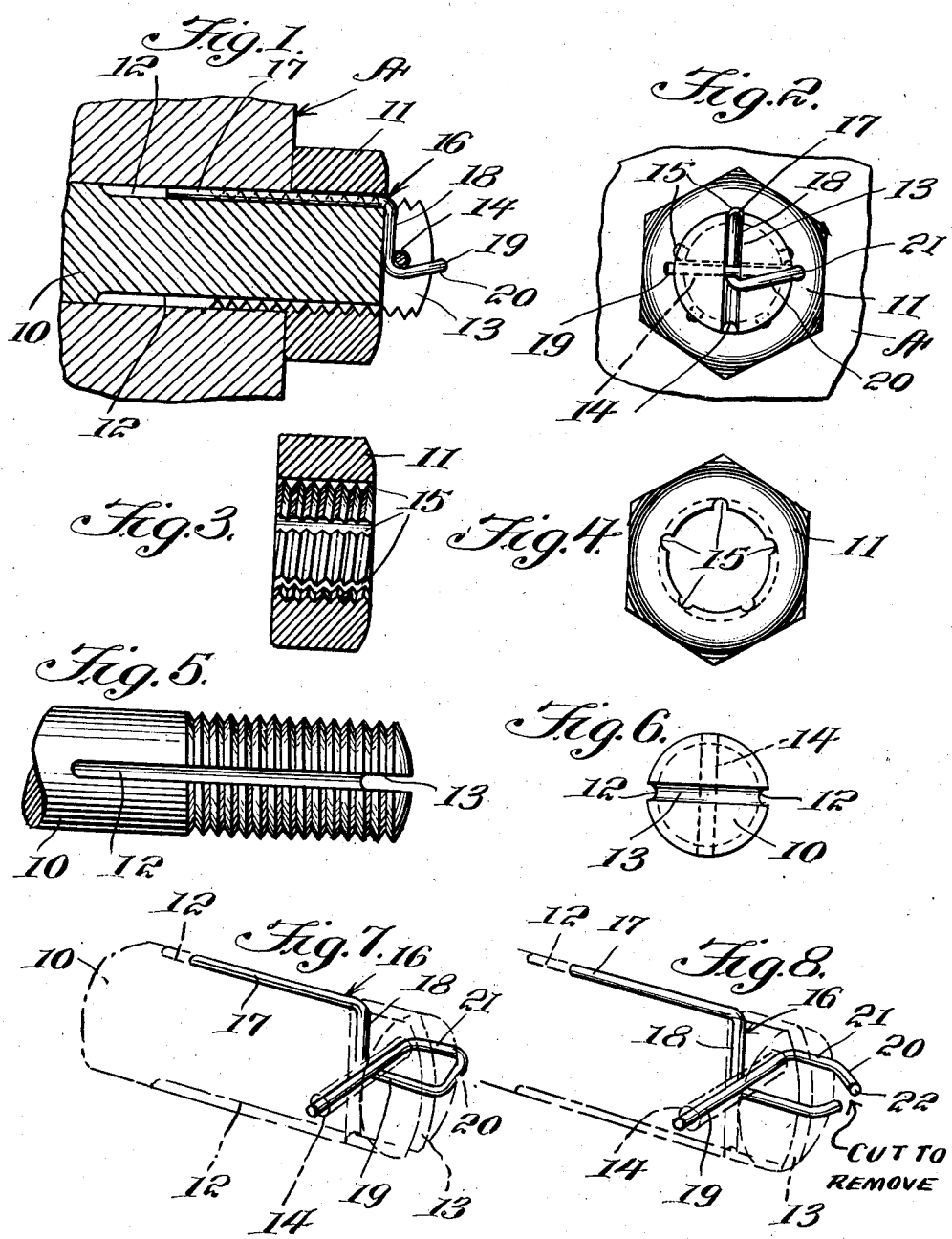
INVENTOR.
Herbert H. Field,
BY Victor J. Evans & Co.
ATTORNEYS Patented July 16, 1946

2,404,128

UNITED STATES PATENT OFFICE 2,404,128

LOCK TO SECURE NUTS ON BOLTS

Herbert H. Field, Rock Falls, Ill.

Application November 8, 1944, Serial No. 562,466

3 Claims. (Cl. 151—8)

The invention relates to a locking device, and more especially to a bolt and nut locking device.

The primary object of the invention is the provision of a device of this character, wherein a nut threaded on a bolt can be firmly and securely locked in place in any desired adjusted position, without liability of such nut or bolt becoming loosened or separating from each other, the device being in the form of a bendable wire for interlocking engagement with the bolt and nut.

Another object of the invention is the provision of a device of this character, wherein its application can be had with ease and dispatch, and on placement for locking purposes is readily accessible for severance to permit the nut to be removed from the bolt for separation thereof.

A further object of the invention is the provision of a device of this character, wherein the same when in locking engagement cannot become accidentally mutilated, with resultant freeing of the bolt from the nut, and in this manner assuring safety in the use of the same.

A still further object of the invention is the provision of a device of this character, which is simple in construction, thoroughly reliable, safe and efficient in the working and purpose thereof, strong, durable, readily and easily applied and removed, economical in construction, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is a fragmentary section view through a piece of work with a nut carrying bolt fitted thereto and showing the locking device constructed in accordance with the invention applied thereto.

Figure 2 is a view looking toward the nut end of the bolt with the locking device in locking position.

Figure 3 is a sectional view through the nut showing the channel seats for the locking device.

Figure 4 is an outer face view of the nut detached from the bolt.

Figure 5 is a fragmentary side elevation of the bolt.

Figure 6 is an outer end view thereof.

Figure 7 is a fragmentary phantom perspective view of the bolt with the device applied locking position for the nut.

Figure 8 is a view similar to Figure 7 showing the device severed or cut for the releasing of the nut from the bolt.

Similar reference characters indicate corresponding parts throughout the several views in the drawing.

Referring to the drawing in detail, A designates generally a portion of a piece of work, having engaged therein a screw threaded bolt, a portion thereof being denoted at 10, and carried by this bolt is a nut 11, which is threaded thereon to a point for the fastening of the bolt in place, as best seen in Figure 1, with respect to the said piece of work.

The bolt at diametrically opposite sides thereof is provided with longitudinally disposed channels 12, which are aligned with each other following the axis of the said bolt, and communicate at their outer ends with a bifurcation or slot 13 formed crosswise of the bolt, intersecting its center, and opening through the outer end of the shank of such bolt. The bolt is provided with a transverse passage or bore 14, which is at substantially right angles to the lay of the bifurcation or slot 13 and is carried through opposite sides of such bolt for free access, the passage or bore 14 being in intersecting relation to the bifurcation or slot 13.

The nut 11 in the wall of the clearance for the bolt 10 is provided channel-like key-ways 15 which are selectively spaced from each other concentrically to the said clearance and open into the latter in its longitudinal direction or aligned with the bolt 10 when engaged in such clearance.

Adapted for cooperation with the bolt and nut is a locking device, comprising a bendable locking wire 16 of a required length, which on application has its end stretch 17 resting within one of the channels 12, this being accomplished before the nut is threaded onto the bolt, the intermediate portion of the wire having an elbow formation 18 created by bending, which is counterseated in the slot 13, and this elbow 18 may be effected before or after the application of the nut to the bolt, which also may be true with respect to the laying of the stretch 17 of such wire in the channel 12. The nut 11 as will appear in Figure 1 of the drawing will be worked home inwardly of the slot 13, so that the outer stretch 19 of the wire 16, in this instance, is freely accessible, and its portion next to the elbow 18 can be looped as at 20 over the outer end of the bolt 10 and the stretch 19 threaded or laced through the passage or bore 14 to interlock with the elbow 18 inwardly of the slot 13, as best seen in Figures 7 and 8 of the drawing. The outer side 21 of the loop 20 protrudes over the outer face of the nut 11 when in the position shown in Figure 2 of the drawing beyond the non-channeled side of the bolt 10, and thus holds the nut on the bolt and against loosening action with respect to each other. One or more passages or bores 14 can be instituted in the shank of the bolt 10 to enable variable locking adjustment of the nut 11 when engaged thereon. The channel-like key-ways 15 in the nut are adapted to register with the channels 12 in the bolt 10 for giving sufficient clearance to the latter for the insertion of the stretch 17 of the wire 16 in such channels 12 without thread interference on the wire.

As will appear in Figure 8 of the drawing, when it is desired to remove the nut from the bolt, the wire 16 is severed as at 22 in the loop 20, and the severed portions of such wire withdrawn from the bolt.

What is claimed is:

1. A locking device for a bolt having a bifurcated end, provided with a passage crossing the bifurcation, and a nut threaded on the bolt inwardly of the bifurcation, comprising a bendable locking wire having one end stretch seated longitudinally in the bolt, an elbow portion within the bifurcation, and another end stretch looped over the bifurcated end of the bolt and threaded in the passage to be disposed at substantially right angles to such bifurcation with the outside portion of the loop overlying the nut.

2. A locking device for a bolt having a bifurcated end, provided with a passage crossing the bifurcation, and a nut threaded on the bolt inwardly of the bifurcation, comprising a bendable locking wire having one end stretch seated longitudinally in the bolt, an elbow portion within the bifurcation, and another end stretch looped over the bifurcated end of the bolt and threaded in the passage to be disposed at substantially right angles to such bifurcation with the outside portion of the loop overlying the nut, the bolt being formed with channels for selectively seating the first mentioned end stretch of the wire.

3. A locking device for a bolt having a bifurcated end, provided with a passage crossing the bifurcation, and a nut threaded on the bolt inwardly of the bifurcation, comprising a bendable locking wire having one end stretch seated longitudinally in the bolt, an elbow portion within the bifurcation, and another end stretch looped over the bifurcated end of the bolt and threaded in the passage to be disposed at substantially right angles to such bifurcation with the outside portion of the loop overlying the nut, the bolt being formed with channels for selectively seating the first mentioned end stretch of the wire, the loop and elbow portions of the wire being interlocked with each other.

HERBERT H. FIELD.